March 17, 1964  B. L. MIDDLEBROOKS  3,124,826
APPLICATOR FOR APPLYING A BONDING AGENT TO INERT
SLIVERS THAT ARE TO BE USED IN SOLID
PROPELLANT ROCKET MOTORS
Filed April 12, 1963  2 Sheets-Sheet 1
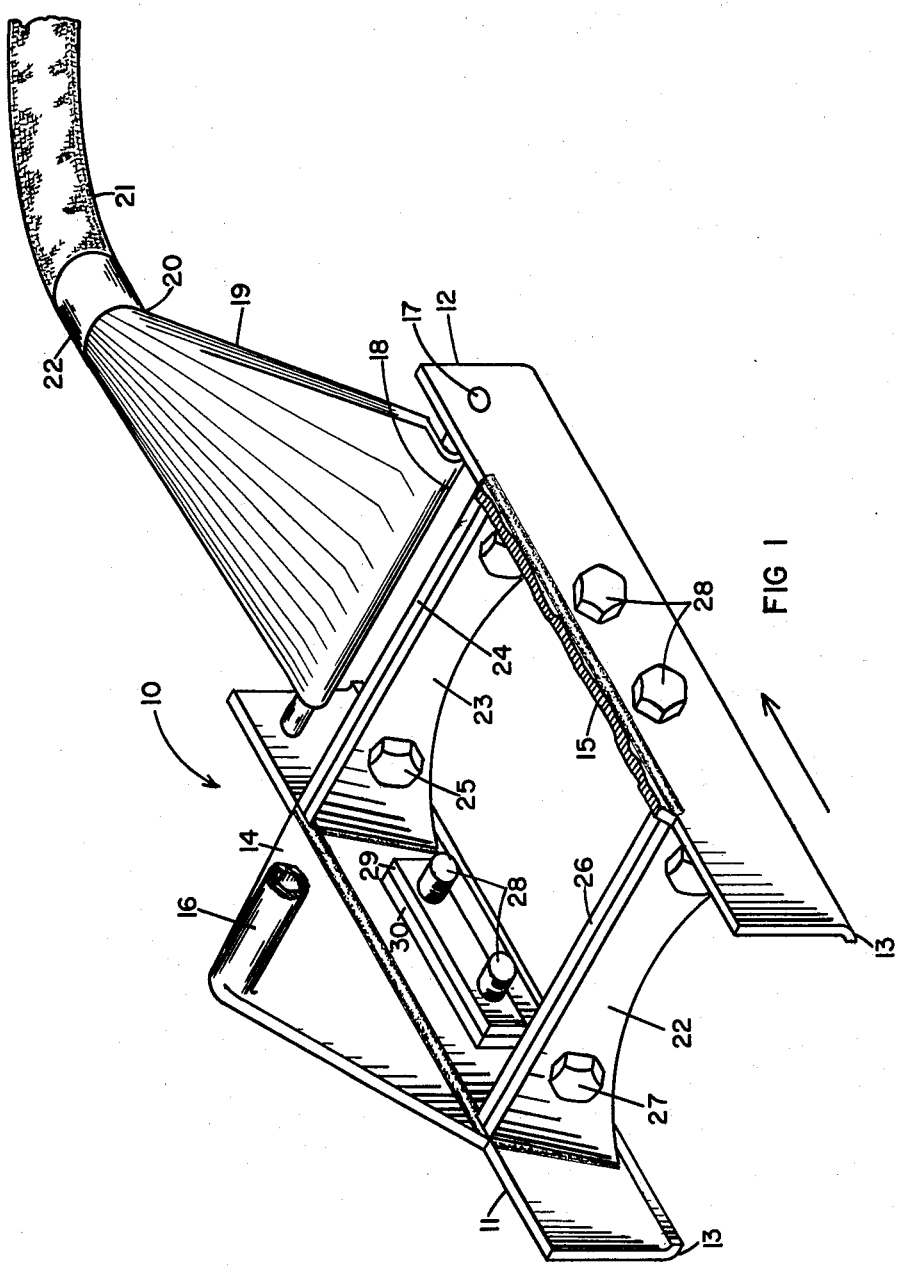
BRYCE L. MIDDLEBROOKS
INVENTOR.
BY
ATTORNEY March 17, 1964 B. L. MIDDLEBROOKS 3,124,826
APPLICATOR FOR APPLYING A BONDING AGENT TO INERT
SLIVERS THAT ARE TO BE USED IN SOLID
PROPELLANT ROCKET MOTORS
Filed April 12, 1963 2 Sheets-Sheet 2
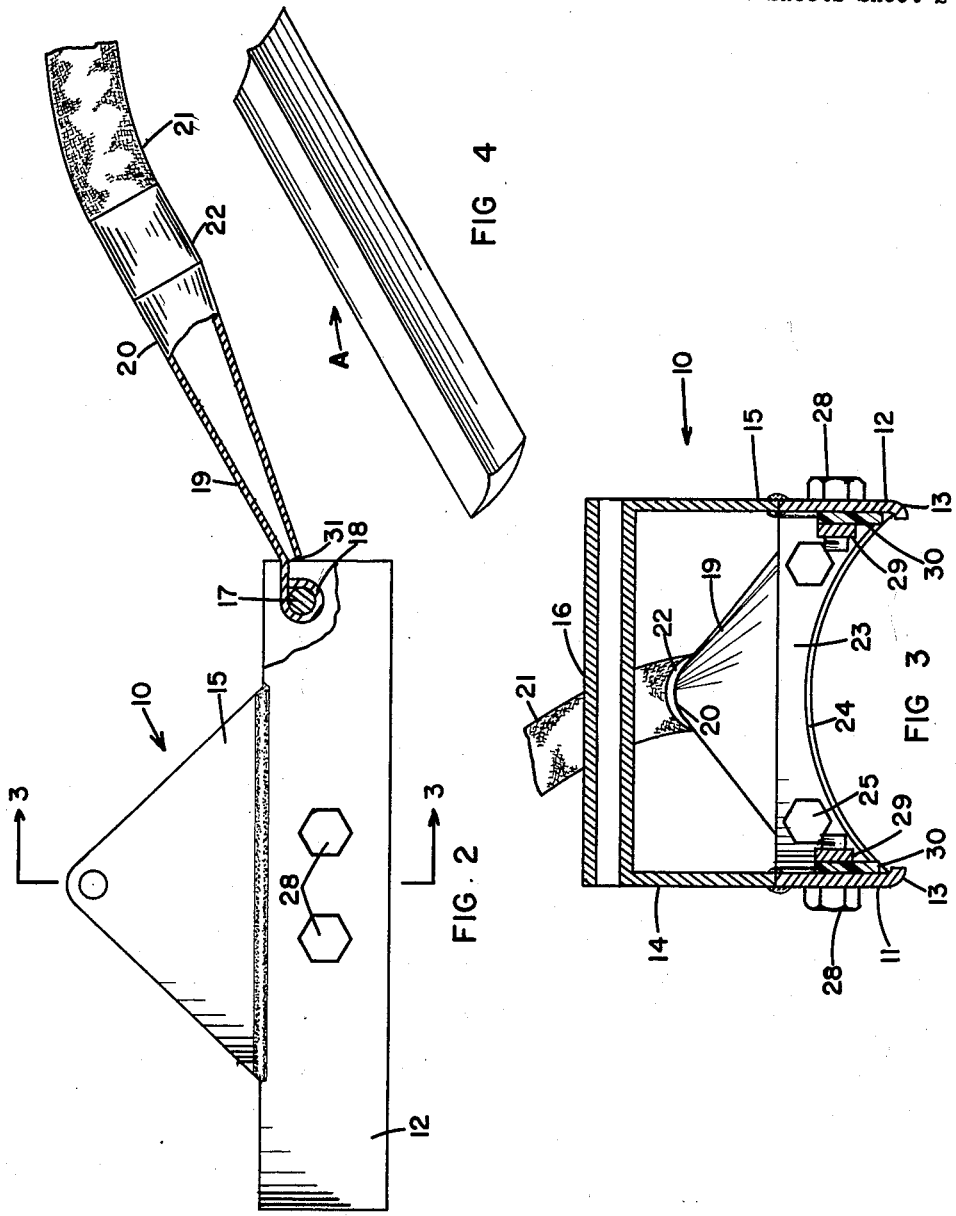
BRYCE L. MIDDLEBROOKS
*INVENTOR.*
BY
ATTORNEY

United States Patent Office 3,124,826
Patented Mar. 17, 1964

3,124,826
APPLICATOR FOR APPLYING A BONDING AGENT TO INERT SLIVERS THAT ARE TO BE USED IN SOLID PROPELLANT ROCKET MOTORS
Bryce L. Middlebrooks, Athens, Ala., assignor to Thiokol Chemical Corporation, Bristol, Pa., a corporation of Delaware
Filed Apr. 12, 1963, Ser. No. 272,762
4 Claims. (Cl. 15—513)

This invention relates to improvements in applicators that are adapted to be used to apply a bonding agent to inert slivers, that are to be systematically positioned on and bonded to the interior wall surface of a motor case that is to be used to provide a solid propellant rocket motor.

In solid propellant rocket motors, the configuration of the propellant, which is commonly bonded to the interior surface of the wall of the motor case, causes the solid propellant to burn from the inside thereof toward the interior surface of the wall of the motor case. Regardless of the configuration of the propellant, portions of the peripheral band of the propellant adjacent to the interior surface of the wall of the motor case, generally called slivers, are left still to be burned after the main body of the solid propellant has burned out. Since the time consumed by the burnout of the propellant slivers affects the thrust of the solid propellant rocket motor, provision is made to replace the propellant slivers during the fabrication of the solid propellant rocket motor with preformed slivers of an inert material. The inert slivers may be attached to the interior surface of the wall of the motor case by the bonding thereof directly to the interior surface of the wall of the motor case, through the medium of a bonding agent which is made from a rubber-like adhesive material.

The application of the bonding agent to the inert sliver so that it can be bonded in place has been a time-consuming endeavor since the bonding agent has been applied by hand, either through the use of a spatula or a stiff bristle brush. No means were provided for determining the thickness of the bonding agent as it was applied; and this occasioned the application of the bonding agent to result in either too thick a layer or too thin a layer of the bonding agent.

In order, therefore, to speed up the application of the bonding agent as well as determine the thickness of the layer of the bonding agent applied to the inert sliver, the present invention was developed.

It is, therefore, an object of the present invention to provide an applicator for applying a bonding agent to an inert sliver that will provide an adequate supply of the bonding agent and also have incorporated therewith means for determining the depth of the layer of the bonding agent as it is being applied to the inert sliver.

Another object of the present invention is to provide an applicator that is simple to manufacture, efficient in its operation, and that will greatly reduce the time consumed in applying a bonding agent to an inert sliver.

With the above and other objects and advantages in view, the invention consists of the novel details of construction, arrangement, and combination of parts more fully hereinafter described, claimed, and illustrated in the accompanying drawings in which:

FIGURE 1 is a perspective view, partly broken away, of the applicator embodying the invention.

FIGURE 2 is a side elevational view, partly broken away and partly in section, of the applicator of FIGURE 1.

FIGURE 3 is a vertical sectional view taken on line 3—3 of FIGURE 2, and

FIGURE 4 is an elevational view of the type of inert sliver with which the applicator is to be used.

Referring more in detail to the drawings wherein like parts are designated by like reference numerals, the reference numeral 10 is used to generally designate an applicator embodying the present invention.

The applicator 10 comprises a pair of oppositely and vertically disposed parallel side rails 11 and 12 respectively. The bottom longitudinal edge of each of the side rails 11 and 12 is curved inwardly as at 13 to provide supporting ledges for the longitudinal edges of the inert sliver A, as shown in FIGURE 4, as well as in Thiokol Chemical Corporation Patent 2,987,882. Rigidly secured, as by welding, to the medial portions of the top longitudinal edges of each of the side rails 11 and 12 are substantially triangular shaped handle-supporting plates 14 and 15 respectively. A tubular handle 16 extends transversely of the applicator 10 between the apexes of the plates 14 and 15 and may be rigidly secured thereto or be formed integral therewith.

The arrow shown in FIGURE 1 depicts the direction of travel of the applicator 10 when it is in operational contact with the inert sliver A. Thus the right hand end of the applicator 10, as shown in the drawings, is the fore end of the applicator 10. Extending between the fore ends of the side rails 11 and 12 is a bearing or supporting rod 17 and the rod 17 receives thereon the curved longitudinal edge 18 of a dispersing funnel or nozzle 19. The edge 18 is bent rearwardly upon itself to conform to and loosely engage the rod 17 as shown in FIGURE 2. The inlet neck 20 of the funnel 19 has a supply hose 21 secured thereto by a coupling band 22 and the supply hose 21 and funnel 19 supply the bonding agent to the applicator 10.

Extending transversely of the applicator 10 between the side rails 11 and 12 and rigidly secured thereto at their opposite ends are a pair of cross braces 22 and 23 respectively. The cross braces 22 and 23 are tilted forwardly at the upper longitudinal edges so that they are in slightly inclined angular relation to the side rails 11 and 12. The bottom longitudinal edge of each of the cross braces 22 and 23 is of arcuate formation in cross section as clearly shown in FIGURES 1 and 3.

A sweep blade 24 is removably secured to the cross brace 23 by machine bolts 25 annd the bottom longitudinal edge of the blade 24 is also arcuate in formation to conform to the configuration of the bottom longitudinal edge of the cross brace 23. The openings in the cross brace 23 that receive the bolts 25 are of a sufficient size to permit the blade 24 to be adjusted in relation to the cross brace 23 so that the bottom edge of the blade 24 may be adjusted in relation to the surface of the inert sliver A on which the bonding agent is being applied. The cross brace 22 also has a sweep blade 26 removably secured thereto by bolts 27 and the blade 26 is also adjustable in like manner as is the blade 24 except that the blade 26 may be adjusted more closely to the surface of the inert sliver A than the blade 24. The second sweep blade 26 thus smoothes out any irregularities caused by the first sweep blade 24 and the grooves created by the guide plates 30. Sweep blade 26 is thus set to give the desired thickness of the bonding agent that is to be applied to the inert sliver.

Secured to each of the side rails 11 and 12 by means of the machine bolts 28, are guide plates retaining supports 29. The supports 29 serve to adjustably retain the guide plates 30 on the side rails 11 and 12 and the guide plates 30 are positioned intermediate of the inner surfaces of the side rails 11 and 12 and supports 29. The adjustability of the guide plates 30 being achieved through the elongation of the openings therein through which the bolts 28 extend.

Except for the sweep blades 24 annd 26 and guide plates 30 which are made from Teflon, the applicator 10 is made from a light noncorrosive metal that is durable under the conditions to which the applicator is subjected.

As previously pointed out, the inert sliver A is bonded to the interior surface of a motor case for a solid propellant rocket motor; and in order to bond the sliver A, a bonding agent must be applied to that surface of the inert sliver that is bonded to the motor case. The inert sliver A, as shown in FIGURE 4, illustrates that portion of the inert sliver A that is in contact with the solid propellant as it is cast in the motor case. Thus it is that surface not shown in FIGURE 4 that has the bonding agent applied thereto.

In the use of the applicator 10 the inert sliver A is positioned so that the lower surfaces of the longitudinal edges of the inert sliver A engage the ledges of the side rails 11 and 12; and as the inert sliver A progresses through the applicator 10, the guide plates 30 engage the upper surfaces of the longitudinal edges of the inert sliver A. Thus neither the inert sliver A nor the applicator 10 can tilt forward, backward, or sideways of each other as the bonding agent is being applied.

The inert sliver A is inserted into the fore end of the applicator 10; and the bonding agent is applied to the surface of the inert sliver A through the outlet mouth 31 of the funnel 19. The flow of the bonding agent outwardly of the funnel 19 is controlled by the pressure medium that supplied the bonding agent. Thus the speed of movement of the applicator 10 along the inert sliver A is controlled by the rapidity of the flow of the bonding agent from the outlet mouth 31 of the funnel 19.

The guide plates 30 and sweep blades 24 and 26 are adjusted to perform their functions as previously described and the applicator is ready to be placed into operation.

The inert sliver is light in weight and it is not necessary to have any special equipment available for the handling thereof as the bonding agent is applied thereto. Only one man hour is required to perform the application of the bonding agent to a complete set of inert slivers A whereas it had previously required eight man hours to complete the application of the bonding agent to a complete set of inert slivers A.

There has thus been provided an applicator for applying a bonding agent to an inert sliver that is efficient in operation, durable and time-saving in use; and it is believed that the construction and manner of use of the applicator will be apparent to those skilled in the art, it being understood that changes in the detail of construction, arrangement and combination of the various components of the applicator may be resorted to provided they fall within the spirit of the invention and the scope of the appended claims.

Having thus described the invention, what is claimed as new and desired to be secured by Letters Patent is:

1. An applicator for applying a bonding agent to an inert sliver for use in a motor case of a solid propellant rocket motor comprising a pair of side rails, means on said side rails for supporting the inert sliver therebetween, means carried by said side rails for applying and determining the thickness of the bonding agent as it is applied to the inert sliver, a funnel having a supply hose connected thereto for supplying the bonding agent to said applicator, a support rod secured at its opposite ends to said rails and a curved longitudinal edge on said funnel for mounting said funnel on said support rod for oscillatory movement thereof with relation to said support rod.

2. An applicator, as in claim 1, wherein a pair of cross braces extend between and are secured to the opposite ends of said side rails and the means for applying said bonding agent to said inert sliver is adjustably connected to said cross braces.

3. An applicator, as in claim 1, wherein guide plate retaining means are secured to said side rails in opposed relation to each other and guide plates are adjustably mounted on said side rails by said retaining means.

4. An applicator, as in claim 1, wherein the lower longitudinal edges of said side rails are curved inwardly to provide the means for supporting said inert sliver.

References Cited in the file of this patent

UNITED STATES PATENTS 1,505,908     MacKinnon  _____ Aug. 19, 1924